United States Patent
Koike

(10) Patent No.: US 10,091,703 B2
(45) Date of Patent: Oct. 2, 2018

(54) RELAY APPARATUS

(71) Applicant: DENSO CORPORATION, Kariya, Aichi-pref. (JP)

(72) Inventor: Tomoyuki Koike, Kariya (JP)

(73) Assignee: DENSO CORPORATION, Kariya (JP)

(*) Notice: Subject to any disclaimer, the term of this patent is extended or adjusted under 35 U.S.C. 154(b) by 190 days.

(21) Appl. No.: 15/071,360

(22) Filed: Mar. 16, 2016

(65) Prior Publication Data

US 2016/0277998 A1    Sep. 22, 2016

(30) Foreign Application Priority Data

Mar. 20, 2015  (JP) .................................. 2015-58112
Mar. 14, 2016  (JP) .................................. 2016-49619

(51) Int. Cl.
*H04W 40/22*  (2009.01)
*H04L 29/06*  (2006.01)

(52) U.S. Cl.
CPC ......... *H04W 40/22* (2013.01); *H04L 65/4076* (2013.01)

(58) Field of Classification Search
CPC ............................ H04W 40/22; H04L 65/4076
USPC ........................................................ 370/315
See application file for complete search history.

(56) References Cited

U.S. PATENT DOCUMENTS

| 5,812,594 | A  | * | 9/1998  | Rakib     | H04L 25/4921 |
|           |    |   |         |           | 375/219      |
| 8,817,683 | B2 | * | 8/2014  | Kubo      | H04L 12/1886 |
|           |    |   |         |           | 370/312      |
| 2005/0182948 | A1 | * | 8/2005  | Ducharme  | G06F 21/10   |
|           |    |   |         |           | 713/189      |
| 2006/0282638 | A1 | * | 12/2006 | Oshima    | G06F 3/0622  |
|           |    |   |         |           | 711/170      |
| 2008/0052394 | A1 | * | 2/2008  | Bugenhagen | H04L 12/14  |
|           |    |   |         |           | 709/224      |
| 2010/0238855 | A1 | * | 9/2010  | Yoshida   | H04B 7/155   |
|           |    |   |         |           | 370/315      |
| 2013/0121238 | A1 | * | 5/2013  | Yamada    | H04W 88/04   |
|           |    |   |         |           | 370/327      |
| 2014/0351460 | A1 |   | 11/2014 | Tsuboi et al. |          |

FOREIGN PATENT DOCUMENTS

| JP | 2009-246611 A | 10/2009 |
| JP | 2013-112120 A | 6/2013  |
| JP | 2013-121071 A | 6/2013  |
| JP | 2013-135429 A | 7/2013  |

* cited by examiner

*Primary Examiner* — Ricky Ngo
*Assistant Examiner* — Ellen Kirillova
(74) *Attorney, Agent, or Firm* — Posz Law Group, PLC

(57) ABSTRACT

A relay apparatus connected to communication lines to perform data relay between the communication lines is provided. The relay apparatus includes a receiver unit that receives rewrite information, which includes information for changing setting of the relay apparatus, from a source apparatus via any of the communication lines, a setting changer unit that changes the setting of the relay apparatus in accordance with the rewrite information, and a change information sending unit that sends the rewrite information to another relay apparatus existing in a local network.

6 Claims, 4 Drawing Sheets

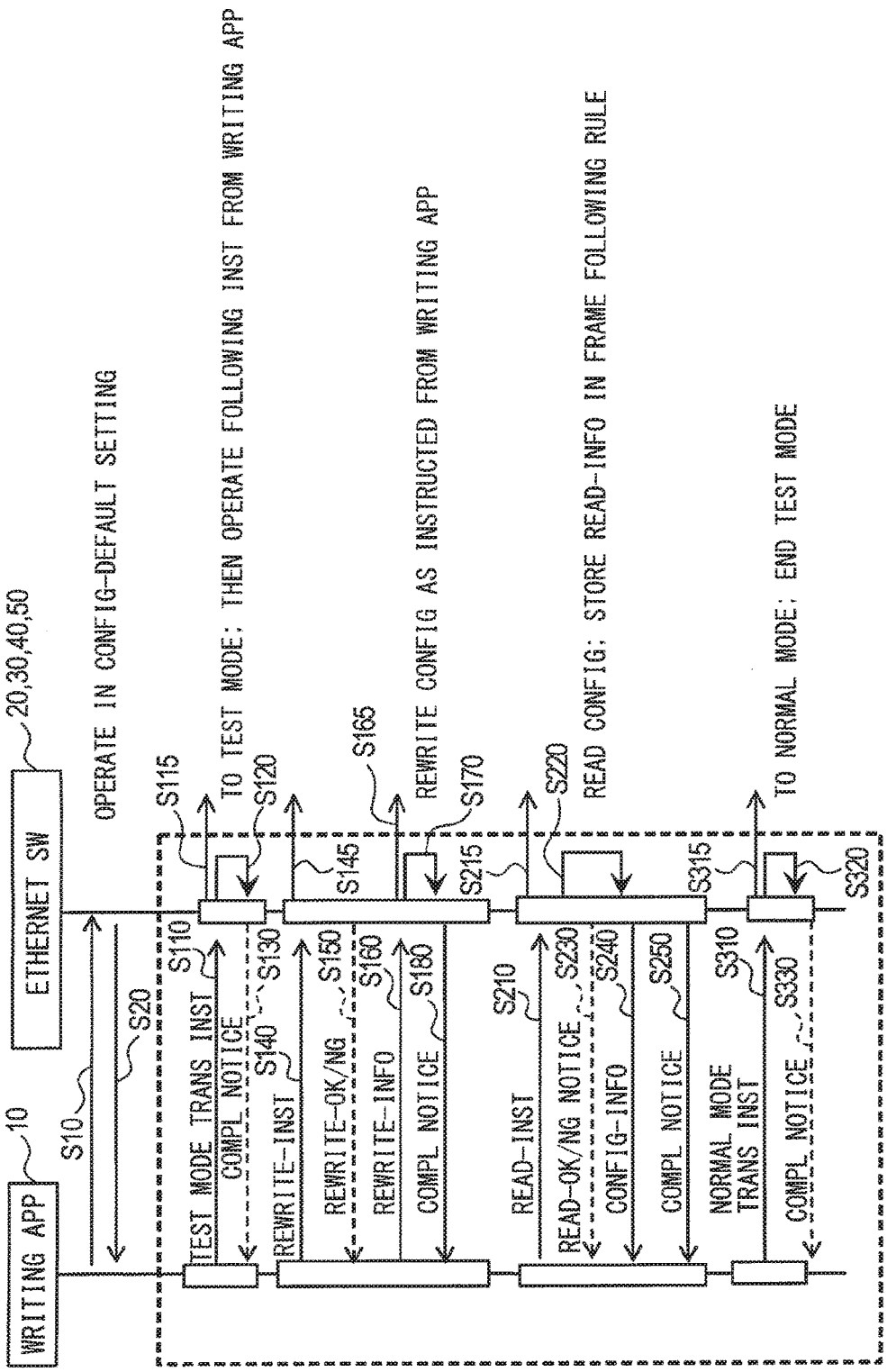

FIG. 3

| 7 OCTETS | 1 | 6 | 6 | 2 | 46 – 1500 | 4 |
|---|---|---|---|---|---|---|
| PREAMBLE | SFD | DESTINATION ADDRESS | SOURCE ADDRESS | LENGTH/ TYPE | DATA/LLC | FCS |

SET MULTICAST ADDRESS TO DESTINATION MAC ADDRESS

FIG. 4

- MULTICAST MAC ADDRESS
  0000 00001 0000 0000 1001 1110 0 xxxxx ············ xxx

IEEE 802.3 COMPLIANT (BIT PATTERN)

MULTICAST IP ADDRESS PORTION IS USED
  (USABLE BECAUSE OF PRIVATE AREA)

THIS 23 BIT
  1. IS USED AS INST-ADDRESS FROM WRITING APP
  2. IS USED AS RES ADDRESS FROM SW

FIG. 5

- INSTRUCTION EXAMPLES
  - TEST MODE TRANSITION INSTRUCTION : 00000 ··· 00001 (23 BITS)
  - REWRITE-INSTRUCTION                : 00000 ··· 00010

FIG. 6

- CONFIG-INFO EXAMPLES
  - AUTO NEGOTIATION (IEEE 802.3u) : ENABLED/DISABLED
    (→1ST BIT OF DATA AREA 1ST BYTE IN ETHERNET FRAME)
  - EEE (IEEE 802.3az) : ENABLED/DISABLED
    (→2ND BIT OF DATA AREA 1ST BYTE IN ETHERNET FRAME)

FIG. 7

| 7 OCTETS | 1 | 6 | 6 | 2 | 46 – 1500 | 4 |
|---|---|---|---|---|---|---|
| PREAMBLE | SFD | DESTINATION ADDRESS | SOURCE ADDRESS | LENGTH/ TYPE | DATA/LLC | FCS |

STORE CONFIG INFO IN DATA AREA AND SEND

US 10,091,703 B2

RELAY APPARATUS

CROSS REFERENCE TO RELATED APPLICATION

The present application is based on Japanese Patent Application No. 2015-58112 filed on Mar. 20, 2015 and Japanese Patent Application No. 2016-49619 filed on Mar. 14, 2016, disclosures of which are incorporated herein by reference.

TECHNICAL FIELD

The present disclosure relates to a relay apparatus for performing data relay between multiple communication lines.

BACKGROUND

A configuration for using multiple relay apparatuses in a local network such as a local area network is known (for example, Patent Literature 1).

Patent Literature 1: JP 2009-246611A

When multiple relay apparatuses are used in a local network, a demand to change the setting of the multiple relay apparatuses without spending time and labor arises. However, because a procedure of changing the setting of the relay apparatus is of great variety, the writing apparatus needs to have the procedures that correspond to respective relay apparatuses. Additionally, because a relay apparatus having a microcomputer is expensive, there is a demand to use a relay apparatus having no microcomputer.

SUMMARY

In view of the foregoing, it is an object of the present disclosure to provide a technology that is directed to a relay apparatus for performing data relay between multiple communication lines and that enables a change in setting of multiple switches by a common (same) procedure even when the relay apparatus has no microcomputer.

A relay apparatus in an aspect of the present disclosure comprises a receiver unit, a setting changer unit and a change information sending unit. The receiver unit receives rewrite information, which includes information for changing setting of the relay apparatus, from a source apparatus via any of multiple communication lines. The setting changer unit changes the setting of the relay apparatus in accordance with the rewrite information. The change information sending unit sends the rewrite information to another as relay apparatus existing in a local network.

According to the above relay apparatus, because the relay apparatus changes its own setting based on the rewrite information and relays the rewrite information to another relay apparatus existing in the local network, it becomes possible to collectively change settings of multiple relay apparatuses even when the relay apparatus has no microcomputer or an apparatus having a microcomputer is not connected.

BRIEF DESCRIPTION OF THE DRAWINGS

The above and other objects, features and advantages of the present disclosure will become more apparent from the below-described detailed description made with reference to the accompanying drawings, in which:

FIG. 2 is a ladder chart showing a setting rewrite process;

FIG. 3 is an explanatory diagram showing an example of a data structure of a data that is exchanged in an embodiment;

FIG. 4 is an explanatory diagram showing use of MAC Address as destination address;

FIG. 5 is an explanatory diagram showing an example of instruction sent from a rewrite apparatus;

FIG. 6 is an explanatory diagram showing an example of configuration information; and FIG. 7 is an explanatory diagram showing an example of a data structure of a data that is exchanged in a modification.

DETAILED DESCRIPTION

Figure 1:
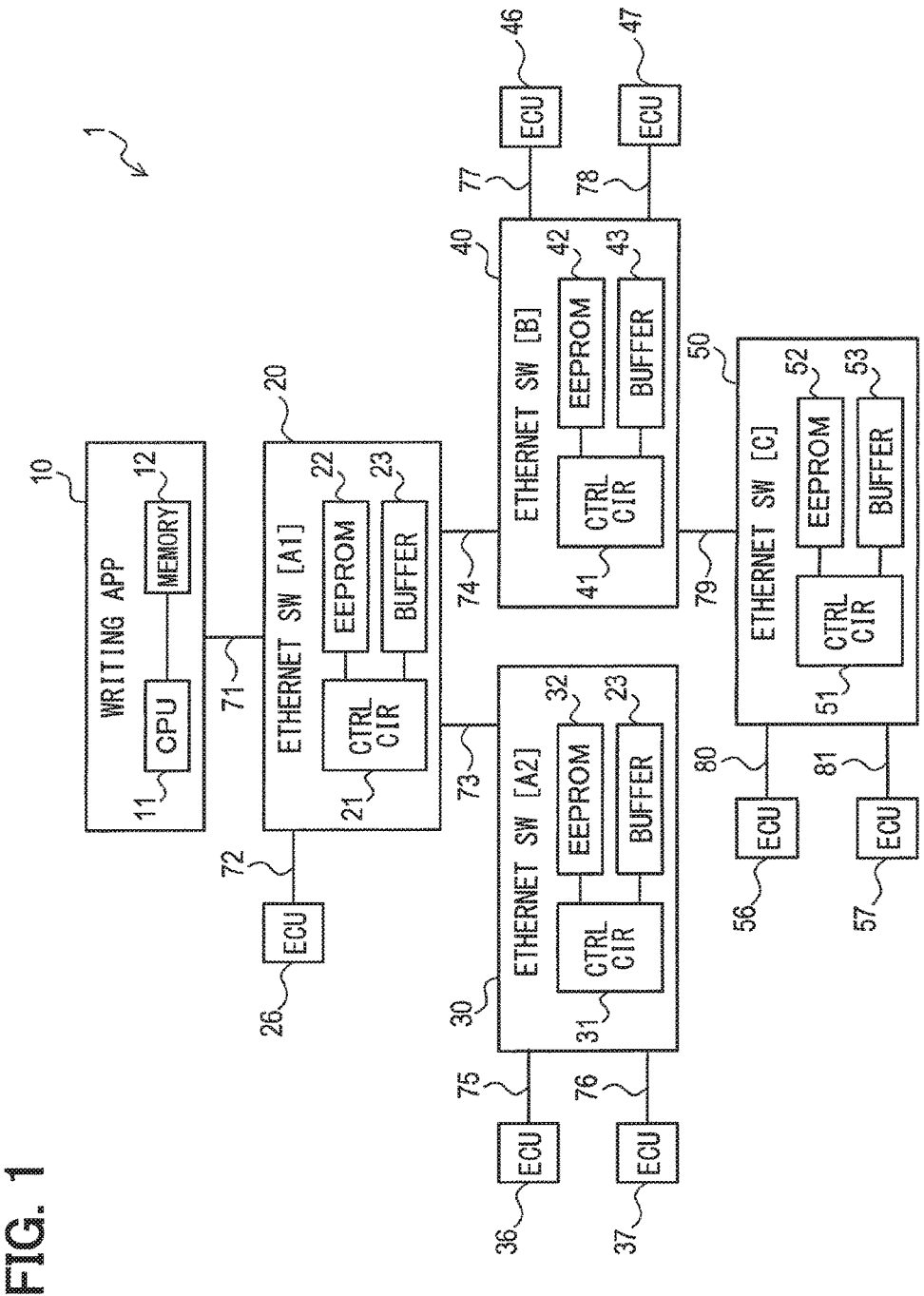
FIG. 1 is a block diagram schematically showing a communication system of an embodiment.

Embodiments will be described with reference to the drawings.

(Structures in the Present Embodiment)

A communication system 1 is mounted in a vehicle, which is for example an automobile. In the communication system 1, multiple apparatuses are communicable each other within a local network, which is a communication network in the vehicle. As shown in FIG. 1, the communication system 1 includes a writing apparatus 10, multiple Ethernet (registered trademark) switches 20, 30, 40, 50, and multiple electronic control units (ECUs) 26, 36, 37, 46, 47, 56, 57. The writing apparatus 10, the Ethernet switch 20, 30, 40, 50, and the ECUs 26, 36, 37, 46, 47, 56, 57 perform communications via communication lines 71, 72, 73, 74, 85, 76, 77, 78, 79, 80, 81 using Ethernet standards and TCP/IP protocol.

The writing apparatus 10 is provided as one ECU (Electronic Control Unit) and includes a microcomputer (not shown) with a CPU 11, a memory 12 such as a ROM, a RAM and the like. The CPU 11 performs processes based on programs stored in the memory 12.

In the present embodiment in particular, the writing apparatus 10 performs a process for changing communications-related settings of the Ethernet switches 20, 30, 40, 50, which are within the local network constituting the communication system 1. Specifically, the writing apparatus 10 sends a rewrite instruction to the Ethernet switches 20, 30, 40, 50, thereby changing the communications-related settings of the Ethernet switches 20, 30, 40, 50.

Ethernet switch [A1]20, Ethernet switch [A2]30, Ethernet switch [B] 40, Ethernet switch [C]50 are provided as the Ethernet switches 20, 30, 40, 50. Bracketed alphabets [A] [B][C] represent manufacturing companies of the Ethernet switches.

The Ethernet switches [A1][A2] are manufactured by the same manufacturing company. The Ethernet switches [A1] [A2], the Ethernet switch [B]40, and the Ethernet switch [C]50 are manufactured by different manufacturing companies. This shows that in the communication system 1, multiple Ethernet switches manufactured by different manufacturing companies are implementable as network devices.

The Ethernet switches 20, 30, 40, 50 have common parts including control circuits 21, 31, 41, 51, EEPROMs 22, 32, 42, 52, and buffers 23, 33, 43, 53. These parts in the Ethernet switches 20, 30, 40, 50 have substantially the same function and these parts of the Ethernet switch 20 will be described. The explanation on the Ethernet switch 20 is applicable to other Ethernet switches 30, 40, 50.

The control circuit 21 of the Ethernet switch 20 has a relay function. The relay function is a function to send the data, which is received from the connected communication lines 71 to 74, to a communication line that is designated based on a destination MAC address. In performing the relay function, the Ethernet switch 20 temporarily stores the received data in the buffer 23.

The control circuit 21 further has a rewrite function to rewrite setting of an Ethernet switch function stored in the EEPROM 22 in accordance with an instruction from the writing apparatus 10. In the EEPROM 22, the control circuit 21 stores trouble information such as a communication error generated in the Ethernet switch 20 and the like. The trouble information may include, for example, MIB (Management Information Base) and the like.

The ECUs 26, 36, 37, 46, 47, 56, 57 may be known ECUs provided with sensors (not shown), interfaces (not shown) and the like. Each ECU 26, 36, 37, 46, 47, 56, 57 performs predetermined processing and sends a result of the processing via the communication lines.

(Processes in the Present Embodiment)

In the communication system 1, the writing apparatus 10 and the Ethernet switch 20 (Ethernet switches 30, 40, 50 also) perform the setting rewrite process illustrated in FIG. 2. The setting rewrite process is a process corresponding to the above-mentioned rewrite function. The setting rewrite process illustrated in FIG. 2 starts in response to, for example, power on of the communication system 1, and thereafter, the setting rewrite process is repeatedly performed at constant cycles.

As shown in FIG. 2, in the setting rewrite process, first, the writing apparatus 10 and the Ethernet switch 20 start communications using default configuration (config) information (S10, S20). The config is an abbreviation of a configuration and refers to a general setting of communication.

In the present embodiment, the settings relate to auto negotiation defined in IEEE802.3u and EEE defined in IEEE802.3az. Details of these settings will be described later.

When an instruction to rewrite the config information is inputted to the writing apparatus 10 by input of a user's operation or the like, the writing apparatus 10 sends a test mode transition instruction to the Ethernet switch 20 (S110). In the above, the writing apparatus 10 makes the test mode transition instruction by using a record area of a multicast MAC Address.

Specifically, as shown in FIG. 3, an Ethernet frame containing the test mode transition instruction includes a preamble, an SFD (Start of Frame Delimiter), a destination address, a source address, a data area etc. Among these, the destination address includes the MAC address as shown in FIG. 4. Specifically, the MAC Address includes a standard bit pattern indicating multicast and a multicast IP address portion (for example 23 bits).

In this multicast IP address portion, the instruction from the writing apparatus 10 and a response from each Ethernet switch 20, 30, 40, 50 are recorded. For example, as shown in FIG. 5, the test the mode transition instruction is designated as "1" and the rewrite instruction is designated as "2" or the like and these numerical values are expressed in binary form in the multicast IP address portion.

The Ethernet switch 20 which has received the test mode transition instruction transfers the test mode transition instruction to another Ethernet switch 30,40,50 (S115). Because the Ethernet switch 20, 30, 40, 50 which has received the test mode transition instruction transfers the test mode transition instruction in this way, all the Ethernet switches 20, 30, 40, 50 within the local network can receive the test mode transition instruction.

Subsequently, the Ethernet switch 20 transitions to the test mode (S120). After the transition to the test mode, the Ethernet switch 20 becomes able to perform the rewriting of the EEPROM 22 and the like according to the instruction from the writing apparatus 10. In other words, when the operation mode of the Ethernet switch is not the test mode, the change in the setting of the Ethernet switch is prohibited.

The Ethernet switch 20 sends a completion notification indicating the completion of the transition to the test mode to the writing apparatus 10 (S130). When the writing apparatus 10 receives this completion notification, the writing apparatus 10 sends the rewrite instruction (S140). This rewrite instruction is sent by multicast as is the case of the test mode transition instruction. The Ethernet switch 20 transfers the rewrite instruction to another Ethernet switch 30, 40, 50 (S145).

The Ethernet switch 20 sends a response to the writing apparatus 10 indicating that the rewriting is ready (OK, permitted) or prohibited (NG). Methods of determining whether the rewriting is OK or NG are preset in the writing apparatus 10. When the rewriting is prohibited, the setting rewrite process is ended without execution of the subsequent steps.

When the writing apparatus 10 receives the response indicating that the rewriting is ready (OK), the writing apparatus 10 sends the rewrite information to the Ethernet switch 20 (S160). In doing so, the rewrite information is sent by multicast as is the case of the test mode transition instruction.

As shown in FIG. 6, the config information includes enable or disable of execution of the auto negotiation, enable or disable of execution of the EEE (IEEE802.3az) etc. The auto negotiation refers to a function to recognize a communication speed at a time of starting communication. When this function is enabled, it becomes possible for an apparatus (also referred to as a subject apparatus) to switch over a communication speed of the subject apparatus in accordance with a communication speed of a communication counterparty apparatus. This however may make longer the startup time of the subject apparatus. Thus, when a configuration of the communication counterparty apparatus is recognized in advance, it may be preferable to disable this function in some cases.

The EEE (IEEE802.3az) includes a function to intermittently stop a transmission circuit to reduce power consumption during communications. When this function is enabled in both the subject apparatus and the communication counterparty apparatus, the power consumption during communication can be reduced. However, when this function is enabled in the communication counterparty apparatus, the power consumption cannot be reduced.

For these items of the config information, default values are typically designated according to applications such as a consumer use, an industrial use, an automobile use etc. Therefore, with respect to switches having default values of different applications, there is meaning in making these functions common within the local network.

This rewrite information is also stored in the multicast IP address portion. When the Ethernet switch 20 receives this rewrite information, the Ethernet switch 20 transfers the rewrite information to another Ethernet switch 30, 40, 50 (S165). The Ethernet switch 20 rewrites the config information with the information as instructed in the rewrite information (S170).

The Ethernet switch 20 sends, as a response, a completion notification indicating completion of rewriting the config information to the writing apparatus 10 (S180).

The writing apparatus 10 is further configured to read out various kinds of information from the Ethernet switch 20. For example, the writing apparatus 10 may be configured to read out the MIB and the config information.

Specifically, when the writing apparatus 10 receives an instruction to read out information from a user's operation or the like, the writing apparatus 10 causes the Ethernet switch 20 to transition to the test mode (S110 to S120) as described above and sends a read instruction to the Ethernet switch 20 (S210).

The Ethernet switch 20 transfers the read instruction to another Ethernet switch 30, 40, 50 (S215) and performs the reading of information as instructed (S220). The Ethernet switch 20 responds to the writing apparatus 10 to indicate whether the reading is ready (OK) or not (NG) (S230). When the reading is ready (OK), the Ethernet switch 20 sends the instructed information such as the config information and the like to the writing apparatus 10 (S240).

The Ethernet switch 20 sends a completion notification, which indicates completion of the sending, to the writing apparatus 10 (S250).

The content of the response from the Ethernet switch 20 is stored in the multicast IP address portion. When the rewriting of the config information and the reading of the information are finished, the writing apparatus 10 sends a normal mode transition instruction to the Ethernet switch 20 (S310). By multicast, this normal mode transition instruction is sent to all the Ethernet switches 20, 30, 40, 50 within the local network. Specifically, the Ethernet switch 20 transfers the normal mode transition instruction to another Ethernet switch 30, 40, 50 (S315).

The Ethernet switch 20 transitions to the normal mode (S320) and sends a completion notification indicating completion of the transition to the normal mode to the writing apparatus 10 (S330). When these steps are ended, the setting rewrite process is ended.

(Technical Effects of the Present Embodiment)

The control circuit 21, 31, 41, 51 in the above-described Ethernet switch 20, 30, 40, 50 receives the rewrite information, which is for changing the setting of the Ethernet switch, from the rewrite apparatus 10 via any of the multiple Ethernet communication lines. The Ethernet switch changes its setting (the setting of the Ethernet switch which has received there write information) in accordance with the rewrite information and sends the rewrite information to another Ethernet switch existing in the local network.

Therefore, these Ethernet switches 20, 30, 40, 50 change their own settings based on the rewrite information and relay the rewrite information to another Ethernet switch within the local network. Thus, without directly connecting a microcomputer, the present embodiment can collectively change the settings of multiple Ethernet switches within the local network.

Moreover, the above Ethernet switch 20, 30, 40, 50 performs the sending and receiving of the rewrite information by multicast communication. Accordingly, the Ethernet switch 20, 30, 40, 50 uses the multicast instead of the generally-high-use broadcast. Therefore, an influence on broadcast-based communication can be avoided.

Moreover, in the above Ethernet switch 20, 30, 40, 50, the config information is contained in the rewrite information. Because the rewrite information includes the config information, the config information of the respective multiple Ethernet switches can be written into any values.

In the above Ethernet switch 20, 30, 40, 50, the rewrite information is stored in a MAC address record area of the data that contains this rewrite information. Therefore, the MAC address record area can be effectively used.

Moreover, when receiving the test mode transition instruction instructing the transition to the test mode via any of the multiple Ethernet communication lines, the control circuit 21, 31, 41, 51 of the Ethernet switch 20, 30, 40, 50 transitions the operation mode of the Ethernet switch to the test mode. Additionally, when the operation mode of the Ethernet switch is not the test mode, the control circuit prohibits the changing of the setting of the Ethernet switch.

According to this Ethernet switch 20, 30, 40, 50, the Ethernet switch can permit the changing of the setting of the Ethernet switch when it is in the test mode and prohibit the changing of the setting of the Ethernet switch when it is not in the test mode.

Moreover, when completing the changing of its own setting of the Ethernet switch, the control circuit 21, 31, 41, 51 of the Ethernet switch 20, 30, 40, 50 notifies the writing apparatus 10 of the completion notification indicating the completion of the setting change.

Because the Ethernet switch 20, 30, 40, 50 notifies the writing apparatus of the setting change completion, the source (sender) of the rewrite information can recognize the Ethernet switch that has completed the setting change.

Moreover, the control circuit 21, 31, 41, 51 of the Ethernet switch 20, 30, 40, 50 sends the trouble information, which indicates the presence and absence of trouble of the Ethernet switch itself etc., to the rewrite apparatus 10.

According to this Ethernet switch 20, 30, 40, 50, it becomes possible for the source (sender) of the rewrite information to recognize the information on the presence and absence of trouble (MIB).

(Other Embodiments)

Embodiments are not limited to the above-illustrated embodiment. The above embodiment may be modified in various ways. For example, a function of one element in the above embodiment may be distributed to multiple elements. Functions of multiple elements may be integrated into one element. A part of the above embodiment may be replaced with another part having a similar function. A part of the above embodiment may be omitted. A part of the above embodiment may be added to another embodiment and may be replaced with a part of another embodiment.

An embodiment may be the above Ethernet switch. Another embodiment may be a system including the above Ethernet switch. Another embodiment may be a program that causes a computer to function as the above Ethernet switch. The program may be stored in a non-transitory storage medium. Another embodiment may be an Ethernet switch rewriting method.

In the above embodiment, the multicast ID address portion stores the instruction and the rewrite information from the writing apparatus 10, the response from the Ethernet switch 20, 30, 40, 50, and the like. Alternatively, as shown in FIG. 7, a data area may store these. This is effective in particular when an amount of data is large, e.g., when there are many items for the change in the rewrite information, when the trouble information such as MIB is to be sent, and the like.

In a modification, when the Ethernet switch 20, 30, 40, 50 sends the completion notification, this completion notification may contain the trouble information. According to this modification, the sending of the completion notification and the sending of the trouble information can be done at once, and therefore, the number of data exchanges can be reduced.

In the above embodiments, the writing apparatus 10 corresponds to a source apparatus. The Ethernet switch 20, 30, 40, 50 corresponds to a relay apparatus. The Ethernet switch 20, 30, 40 50 which performs S110 and S120 among various processes corresponds to a test mode transition unit (means). The Ethernet switch which performs S150 corresponds to a change prohibition unit (means)

Further, in the above embodiments, the Ethernet switch which performs S160 corresponds to a receiver unit (means), The Ethernet switch which performs S165 corresponds to a change information sending unit. The Ethernet switch which performs S170 corresponds to a setting changer unit (means). The Ethernet switch which performs S180 corresponds to a completion notifier unit (means)

Further, the Ethernet switch which performs S240 corresponds to a trouble information sending unit (means).

What is claimed is:

1. A relay apparatus connected to a plurality of communication lines to perform data relay between the plurality of communication lines, the relay apparatus comprising:
a control circuit and an EEPROM in which a setting in the relay apparatus is stored,
a receiver unit that receives rewrite information, which includes information for changing the setting in the EEPROM of the relay apparatus, from a source apparatus via any of the plurality of communication lines;
a setting changer unit that changes the setting of the relay apparatus in accordance with the rewrite information;
a change information sending unit that sends the rewrite information to another relay apparatus existing in a local network; and
a test mode transition unit that changes an operation mode of the relay apparatus into a test mode upon receipt of a test mode transition instruction, which instructs transition to the test mode, from any of the communication lines, when the setting in the EEPROM is changed based on the rewrite information.

2. The relay apparatus according to claim 1, wherein the relay apparatus receives and sends the rewrite information by multicast communication.

3. The relay apparatus according to claim 1, wherein the rewrite information includes configuration information.

4. The relay apparatus according to claim 1, wherein the rewrite information is included in a data and stored in a MAC address record area of the data.

5. The relay apparatus according to claim 1, further comprising:
a test mode transition unit that changes an operation mode of the relay apparatus into a test mode upon receipt of a test mode transition instruction, which instructs transition to the test mode, from any of the communication lines; and
a change prohibition unit that prohibits the setting changer unit from changing the setting of the relay apparatus when the operation mode of the relay apparatus is other than the test mode.

6. A relay apparatus connected to a plurality of communication lines to perform data relay between the plurality of communication lines, the relay apparatus comprising:
a control circuit and an EEPROM in which a setting in the relay apparatus is stored,
a receiver unit that receives rewrite information, which includes information for changing the setting in the EEPROM of the relay apparatus, from a source apparatus via any of the plurality of communication lines;
a setting changer unit that changes the setting of the relay apparatus in accordance with the rewrite information;
a change information sending unit that sends the rewrite information to another relay apparatus existing in a local network;
a completion notifier unit that notifies the source apparatus of a completion notification indicating completion of the change of the setting when the setting changer unit completes the change of the setting; and
a trouble information sending unit that sends trouble information indicating presence and absence of a trouble of the relay apparatus in response to a request from the source apparatus; wherein
when the completion of the change of the setting is notified, the completion notification of the change of the setting contains the trouble information.

\* \* \* \* \*